United States Patent [19]
Arai et al.

[11] 3,792,642
[45] Feb. 19, 1974

[54] SYSTEM FOR ELECTRICALLY CONTROLLING THE MOVEMENT OF A LOAD FOR STOPPING SAME AT ONE OF A PLURALITY OF PREDETERMINED POSITIONS

[75] Inventors: Hiroshi Arai; Toshihiro Kamiya, both of Toyota, Japan

[73] Assignee: Nippondenso Co., Ltd., Kariya-shi, Japan

[22] Filed: Feb. 25, 1972

[21] Appl. No.: 229,467

[30] Foreign Application Priority Data
Mar. 4, 1971 Japan.............................. 46-11651

[52] U.S. Cl....................... 91/51, 91/357, 91/459
[51] Int. Cl....................... F15b 9/03, F15b 13/044
[58] Field of Search.................... 91/357, 51, 459

[56] References Cited
UNITED STATES PATENTS

| | | |
|---|---|---|
| 2,398,997 | 4/1946 | Berry et al............................ 91/357 |
| 2,999,001 | 9/1961 | Gross................................... 91/357 |
| 3,128,673 | 4/1964 | Moore, Jr............................. 91/357 |
| 3,176,714 | 4/1964 | Smith et al........................... 91/357 |
| 3,411,413 | 11/1968 | MacNeill et al...................... 91/357 |

*Primary Examiner*—Paul E. Maslousky
*Attorney, Agent, or Firm*—Cushman, Darby & Cushman

[57] ABSTRACT

A system for electrically controlling the operation of a spool valve disposed in a hydraulic circuit in a fluid controlled automatic transmission for automotive vehicles so that the valve spool can be reliably moved to and stopped at one of a plurality of predetermined positions thereby changing over fluid passages leading to clutch servo chambers for the engaging and disengaging of the clutches.

5 Claims, 7 Drawing Figures

SYSTEM FOR ELECTRICALLY CONTROLLING THE MOVEMENT OF A LOAD FOR STOPPING SAME AT ONE OF A PLURALITY OF PREDETERMINED POSITIONS

BACKGROUND OF THE INVENTION

1. Field of the Invention

This invention relates to a system for electrically controlling the operation of a load, for example, a spool valve disposed in a hydraulic circuit in a fluid controlled automatic transmission for automotive vehicles so that the valve spool can be reliably moved to and stopped at one of a plurality of predetermined positions thereby changing over fluid passages leading to clutch servo chambers for engaging and disengaging the clutches.

2. Summary of the Invention

It is an object of the present invention to provide a system for electrically controlling the shift of a load and maintaining the load in one of a plurality of predetermined positions comprising a generally cylindrical body defining a cylindrical space therewithin, a plurality of spaced ports arranged in the axial direction of said cylindrical body at positions corresponding to the shift positions of the load, a valve spool having a land slidably received within said cylindrical body thereby partitioning the space within said cylindrical body into two control chambers, said land having an underlapping relation between it and each of said ports, means for supplying fluid under pressure into said control chambers, and means for electromagnetically controlling the communication of said ports with a fluid reservoir so that only one of said ports is selected and communicates with said fluid reservoir in response to the application of a corresponding one of a plurality of predetermined electrical signals, whereby, in response to the communication of said selected port with said fluid reservoir, said land of said valve spool is moved toward said selected ports by being urged by the difference between the fluid pressures within said control chambers until it stops at a position opposite to the center of said selected port, and the fluid within said control chambers flows into said selected port through the gaps between said selected port and said land due to the underlapping relation therebetween. The present invention having the features set forth in the above is advantageous in that the land of the valve spool can be stably maintained stationary in the selected position, the movement of the valve spool can be electrically remotely controlled, and any strict tolerance is not required during the machining of the valve spool.

Another object of the present invention is to provide a control system of the above character, in which said means for electromagnetically controlling the communication of said ports with said fluid reservoir comprises a logical circuit generating the electrical signal by the combination of logical signals the number of which is less than the number of said ports, a plurality of solenoids selectively energized by the electrical signal delivered from said logical circuits, the number of said solenoids being at least equal to the number of said ports, and fluid passage means controlled by the energized solenoid to allow said selected port to communicate with said fluid reservoir.

A further object of the present invention is to provide a control system of the above character in which said means for electromagnetically controlling the communication of said ports with said fluid reservoir comprises a logical circuit generating the electrical signal by the combination of logical signals the number of which is less than the number of said ports, a plurality of solenoids selectively energized by the electrical signal delivered from said logical circuit, the number of said solenoids being less than the number of said ports and corresponding to the number of said logical signals, and fluid passage means controlled by the energized solenoid to allow said selected port to communicate with said fluid reservoir.

DESCRIPTION OF THE PREFERRED EMBODIMENTS

Figure 1:
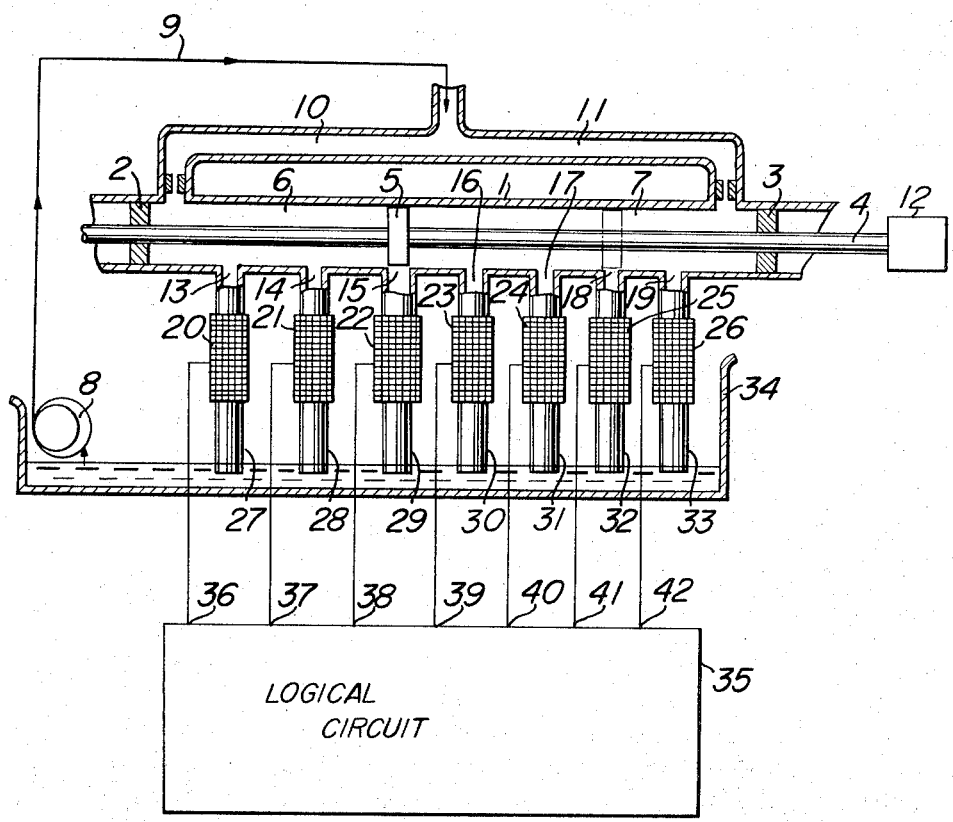
FIG. 1 is a diagrammatic view with parts in vertical section showing the structure of an embodiment of the present invention.

Referring to FIG. 1 showing an embodiment of the present invention, a generally cylindrical body 1 defining a cylindrical space therewithin closed at opposite ends by a pair of sealing members 2 and 3. A valve spool 4 having a land 5 formed integrally therewith extends into the cylindrical space within the cylindrical body 1 so that the land 5 can make sliding movement within the cylindrical body 1. The land 5 partitions the cylindrical space within the cylindrical body 1 into two control chambers 6 and 7. A hydraulic pump 8 supplies fluid under pressure into the two control chambers 6 and 7 by way of fluid passages 9, 10 and 11. One end of the valve spool 4 is connected to a load 12 which may be a spool valve means disposed in a hydraulic circuit in a fluid controlled automatic transmission mounted in an automotive vehicle so as to change over fluid passages leading to clutch servo chambers for engaging and disengaging the clutches. The valve spool 4 is connected to such a spool valve means for moving the valve spool of the spool valve means to one of a plurality of shift positions. A plurality of spaced ports 13, 14, 15, 16, 17, 18 and 19 are arranged in the axial direction of the cylindrical body 1 at positions corresponding to the shift positions of the load 12 in the automatic transmission. A plurality of solenoid operated valves 20, 21, 22, 23, 24, 25 and 26 are associated with the respective ports 13, 14, 15, 16, 17, 18 and 19 so that one of these ports communicates with a fluid reservoir or oil pan 34 in response to the energization of the corresponding one of the solenoid operated valves. A plurality of fluid return conduits 27, 28, 29, 30, 31, 32 and 33 are connected to the respective solenoid operated valves 20, 21, 22, 23, 24, 25 and 26 for returning fluid flowing through the solenoid operated valves into the fluid reservoir or oil pan 34. The hydraulic pump 8 draws fluid from the oil pan 34 to supply the fluid under pressure into the control chambers 6 and 7.

A logical circuit 35, the structure of which will be described in detail later, generates electrical signals which are applied from output terminals 36, 37, 38, 39, 40, 41 and 42 to the respective solenoid operated valves 20, 21, 22, 23, 24, 25 and 26 for controlling the operation of these valves. The solenoid operated valves 20 to 26 and the logical circuit 35 constitute means for electromagnetically controlling the communication of the ports 13 to 19 with the oil pan 34.

Figure 2:
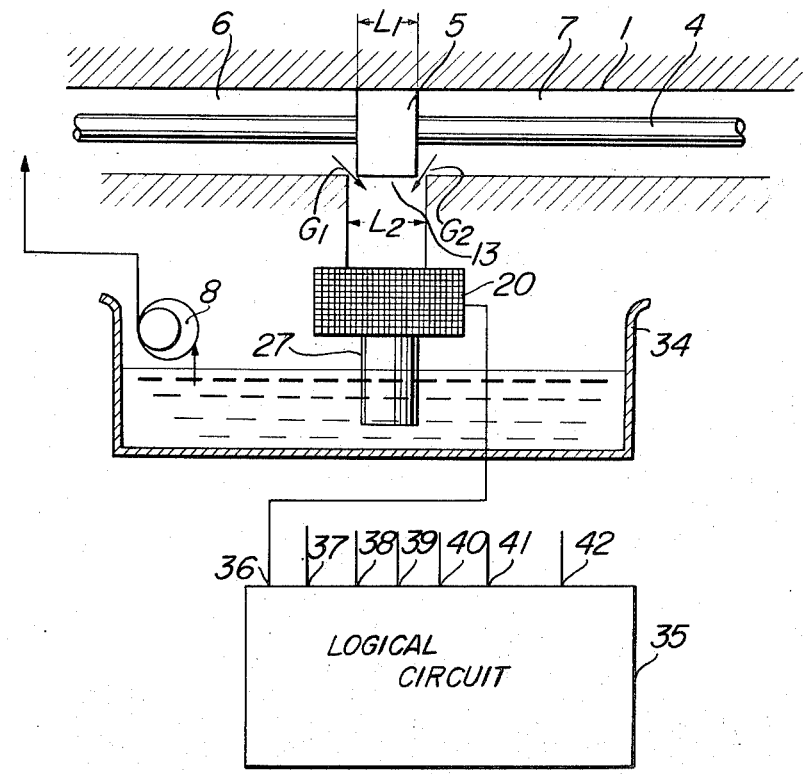
FIG. 2 is an enlarged detail view of parts of the system shown in FIG. 1.

FIG. 2 is an enlarged detail view of parts of the system shown in FIG. 1 and shows the position of the land 5 of the valve spool 4 relative to the port 13. It will be seen from FIG. 2 that the axial length $L_1$ of the land 5 is selected to be smaller than the diameter $L_2$ of the port 13 so that there is an underlapping relation therebetween. The same applies to the remaining ports 14 to 19.

Figure 3:
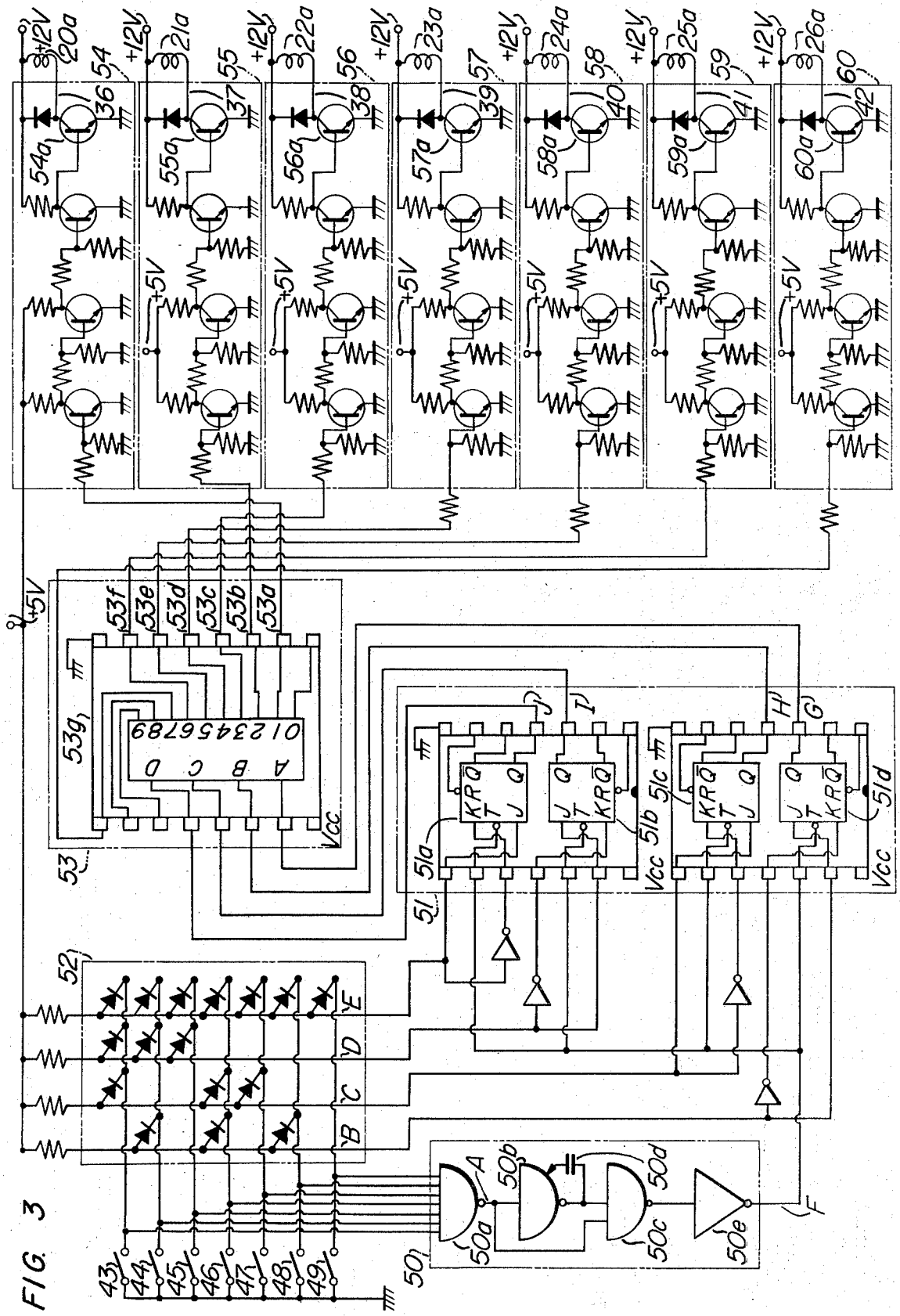
FIG. 3 is an electrical connection diagram showing in detail the structure of a logical circuit shown in FIG. 1.

Referring to FIG. 3 showing in detail the structure of the logical circuit 35, a plurality of switches 43, 44, 45, 46, 47, 48 and 49 corresponding to the respective ports 13, 14, 15, 16, 17, 18 and 19 are disposed on a keyboard so that one of the shift positions of the load 12 in the automatic transmission can be selected by manipulating the corresponding one of these switches. A clock pulse generator 50 generates a clock pulse in response to the closure of anyone of the switches 43 to 49 and applies the clock pulse to a memory 51. The clock pulse generator 50 is composed of NAND gates 50a, 50b and 50c, a capacitor 50d and an inversion gate 50e. The memory 51 comprises four J-K flip-flops 51a, 51b, 51c and 51d. A diode matrix 52 generates four-bit binary information in response to the closure of anyone of the switches 43 to 49. A decoder 53 converts the binary information stored in the memory 51 into decimal information which appears on one of output leads 53a, 53b, 53c, 53d, 53e, 53f, and 53g. A plurality of amplifiers 54, 55, 56, 57, 58, 59 and 60 each including four transistors are connected to the respective output leads 53a, 53b, 53c, 53d, 53e, 53f and 53g of the decoder 53. The transistors 54a, 55a, 56a, 57a, 58a, 59a and 60a in the last stage of these amplifiers are connected at their collector to the solenoids 20a, 21a, 22a, 23a, 24a, 25a and 26a of the respective solenoid operated valves 20 to 26.

An output having a waveform as shown in FIG. 4a appears on an output lead A of the NAND gate 50a. Outputs having waveforms as shown in FIGS. 4b, 4c, 4d and 4e appear on output leads B, C, D and E of the diode matrix 52 respectively. An output having a waveform as shown in FIG. 4f appears on an output lead F of the inversion gate 50e. Outputs having waveforms as shown in FIGS. 4g, 4h, 4i and 4j appear on output leads G, H, I and J of the memory 51 respectively.

Figure 4:
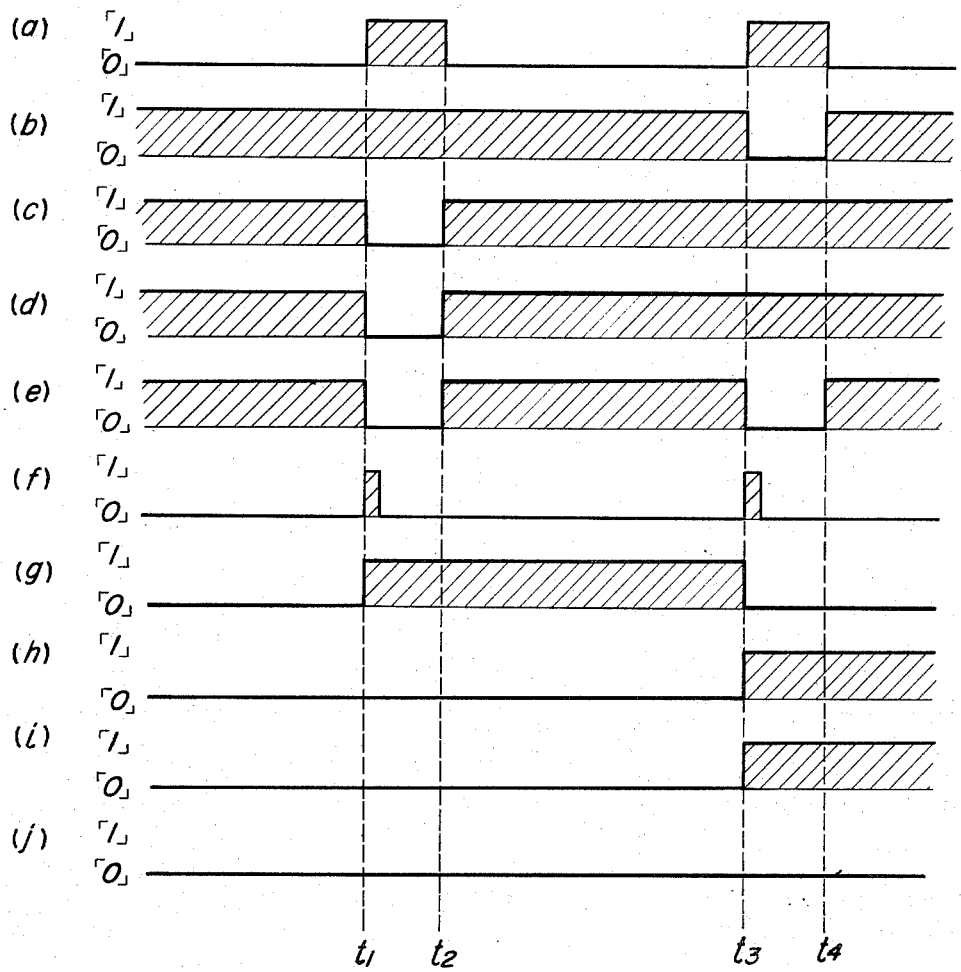
FIG. 4 shows voltage waveforms appearing at various parts of the logical circuit shown in FIG. 3.

The first embodiment of the present invention having the structure above described operates in a manner as described below. Suppose that the land 5 of the valve spool 4 is located at a position opposite to the port 15 as shown in FIG. 1. When now the switch 43 on the keyboard is closed at time $t_1$ and is then opened again at time $t_2$ in FIG. 4 in such a position of the land 5, the output appearing on the output lead A of the NAND gate 50a attains its "1" level during the period of time of from $t_1$ to $t_2$ as shown in FIG. 4a, and signals as shown in FIGS. 4b, 4c, 4d and 4e appear on the output leads B, C, D and E respectively of the diode matrix 52. That is, four-bit binary information 1,000 is delivered from the diode matrix 52 to be applied to the memory 51. As soon as the switch 43 is closed at time $t_1$, a clock pulse as shown in FIG. 4f appears on the output lead F of the clock pulse generator 50 to be applied to the memory 51. In response to the application of the clock pulse to the memory 51, it stores the binary information 1,000 therein, and signals as shown in FIG. 4g, 4h, 4i and 4j appear on the respective output leads G, H, I and J of the memory 51. The binary information 1,000 is applied by the leads G, H, I and J to the decoder 53, and a signal "0" level appears solely on the output lead 53a of the decoder 53, with the result that the transistor 54a in the amplifier 54 conducts. Due to the conduction of the transistor 54a, the solenoid 20a of the solenoid operated valve 20 is energized to open the valve 20 so that the port 13 communicates with the oil pan 34 through the solenoid operated valve 20 and the return conduit 27. As a result, the fluid pressure within the control chamber 6 is instantaneously reduced to a valve lower than the fluid pressure within the control chamber 7, and the land 5 of the valve spool 4 is urged toward the port 13 by the differential pressure across the control chambers 6 and 7. The land 5 of the valve spool 4 ceases to move when it is brought to a position opposite to the center of the port 13 as seen in FIG. 2. Due to the fact that the axial length $L_1$ of the land 5 is smaller than the diameter $L_2$ of the port 13, gaps $G_1$ and $G_2$ are produced therebetween, and because of this underlapping relation between the land 5 and the port 13, fluid under pressure within the control chambers 6 and 7 flows into the port 13 through the gaps $G_1$ and $G_2$ to return to the oil pan 34 through the solenoid operated valve 20 and return conduit 27. It will be seen that the land 5 of the valve spool 4 can be stably maintained at the predetermined position opposite to the center of the port 13 due to the fact that the fluid under pressure within the control chambers 6 and 7 flows into the port 13 through the gaps $G_1$ and $G_2$ because of the underlapping relation between the land 5 and the port 13. The load 12 which is connected to the valve spool 4 is shifted with the movement of the valve spool 4 until it is moved to one of the shift positions corresponding to the shifted position of the land 5.

Then, when the switch 48 on the keyboard is closed at time $t_3$ and is then opened again at time $t_4$ in FIG. 4 in order to shift the load 12 to another shift position from the above position, the output appearing on the output lead A of the NAND gate 50a attains its "1" level again during the period of time of from $t_3$ to $t_4$ as shown in FIG. 4a, and four-bit binary information 0110 appears on the output leads B, C, D and E of the diode matrix 52 to be applied to the memory 51. In response to the application of a clock pulse from the clock pulse generator 50, the binary information 0110 is stored in the memory 51, and signals as shown in FIGS. 4g, 4h, 4i and 4j appear on the respective output leads G, H, I and J of the memory 51. The binary information 0110 is applied by the leads G, H, I and J to the decoder 53, and a signal of "0" level appears solely on the output lead 53f of the decoder 53, with the result that the transistor 59a in the amplifier 59 conducts. Due to the conduction of the transistor 59a, the solenoid 25a of the solenoid operated valve 25 is energized to open the valve 25 so that the port 18 communicates with the oil pan 34 through the solenoid operated valve 25 and return conduit 32. As a result, the fluid pressure within the control chamber 7 is instantaneously reduced to a valve lower than the fluid pressure within the control chamber 6, and the land 5 of the valve spool 4 is urged toward the port 18 by the differential pressure across the control chambers 6 and 7. The land 5 of the valve spool 4 ceases to move when it is brought to a position opposite to the center of the port 18 as shown by the two-dot chain lines in FIG. 1. Due to the underlapping relation between the land 5 and the port 18, the fluid under pressure within the control chambers 6 and 7 flows into the port 18 through the gaps formed between the land 5 and the port 18 to return to the oil pan 34 through the solenoid operated valve 25 and return conduit 32. Thus, the land 5 can be stably maintained at such position, and hence, the load 12 can be stably maintained at the corresponding shift position. Even when disconnection or any other trouble occurs in the power supply and the solenoid operated valve in the energized state is deenergized and closed, the land 5 can be stably maintained in the position due to the balance between the fluid pressures within the control chambers 6 and 7 on opposite sides of the land 5.

It will be seen that, in response to the closure of anyone of the switches 43, 44, 45, 46, 47, 48 and 49 on the keyboard, the corresponding one of the solenoid operated valves 20, 21, 22, 23, 24, 25 and 26 is energized and opened so that the corresponding port communicates with the oil pan 34 and the land 5 is moved toward this port and is stably maintained in the position opposite to the center of the port because of the underlapping relation therebetween.

Another embodiment of the present invention will be described with reference to FIGS. 5, 6 and 7 in which like reference numerals are used to denote like parts appearing in FIGS. 1, 2 and 3.

Figure 5:
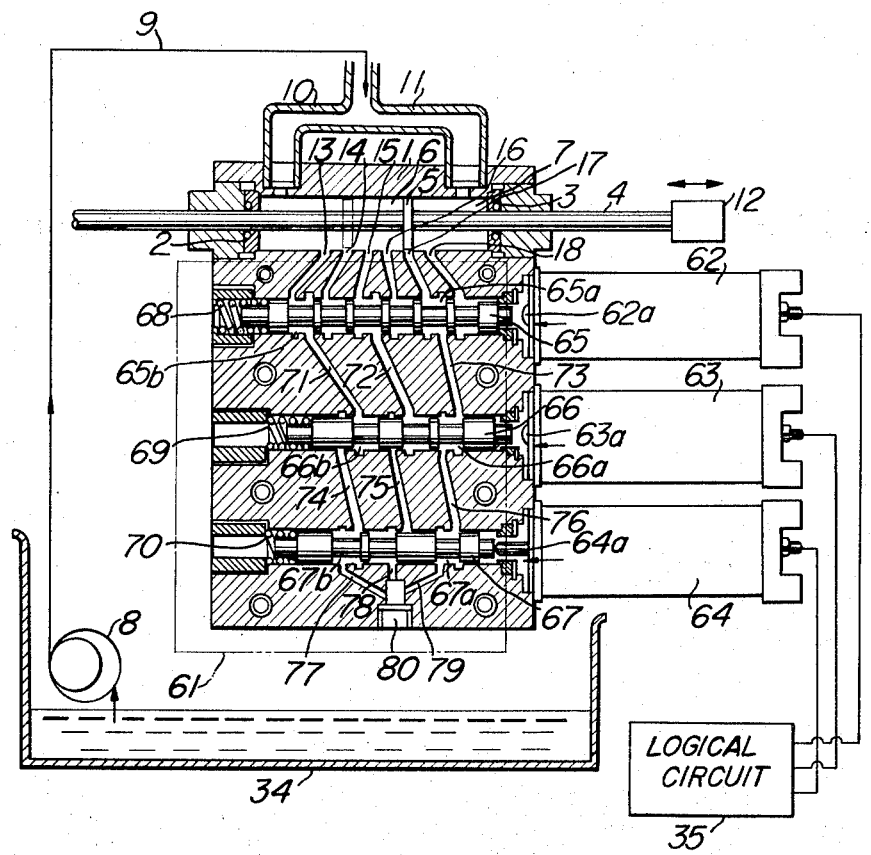
FIG. 5 is a diagrammatic view with parts in vertical section showing the structure of another embodiment of the present invention.

Referring to FIG. 5, a generally cylindrical body 1 defining a cylindrical space therewithin is closed at opposite ends by a pair of sealing members 2 and 3. A valve spool 4 having a land 5 formed integrally therewith extends into the cylindrical space within the cylindrical body 1 so that the land 5 makes a sliding movement within the cylindrical body 1. The land 5 partitions the cylindrical space within the cylindrical body 1 into two control chambers 6 and 7. A hydraulic pump 8 draws fluid from a fluid reservoir or oil pan 34 and supplies fluid under pressure into the two control chambers 6 and 7 by way of fluid passages 9, 10 and 11. One end of the valve spool 4 is connected to a load 12 which may be a spool valve means of the kind described in the first embodiment. A plurality of six spaced ports 13, 14, 15, 16, 17 and 18 are arranged in the axial direction of the cylindrical body 1 at positions corresponding to six shift positions of the load 12. Three solenoids 62, 63 and 64 having respective armatures 62a, 63a and 64a associated therewith are connected to a logical circuit 35 to be selectively energized thereby. When these solenoids 62, 63 and 64 are energized, the armatures 62a, 63a and 64a are urged in a direction shown by the arrow for actuating respective valve spools 65, 66 and 67 each having a plurality of lands. These valve spools 65, 66 and 67 are normally urged toward the armatures 62a, 63a and 64a by return springs 68, 69 and 70 respectively. A fluid circuit 61 includes a plurality of fluid passages 71, 72, 73, 74, 75 and 76 extending between the valve spool 65, 66, and 67 and a plurality of return passages 77, 78, 79 and 80.

Figure 6:
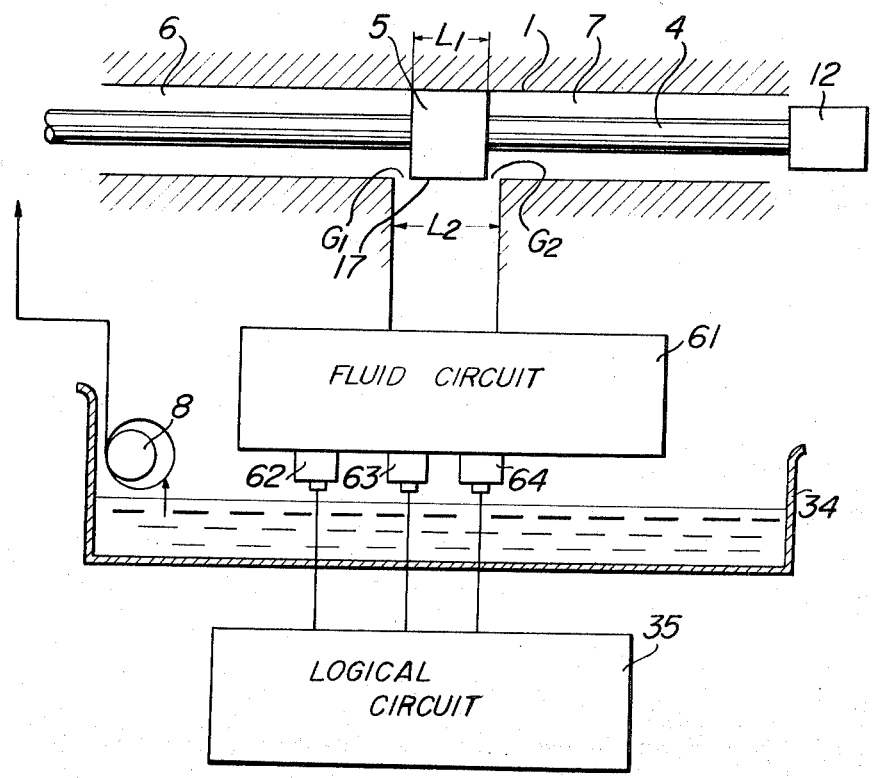
FIG. 6 is an enlarged detail view of parts of the system shown in FIG. 5.

FIG. 6 is an enlarged detail view of parts of the system shown in FIG. 5 and shows the position of the land 5 relative to the port 17. In FIG. 6, the fluid circuit 61 including the valve spools 65 to 67, the fluid passages 71 to 76 and the return passages 77 to 80 is shown by a block. In this embodiment too, the axial length $L_1$ of the land 5 is selected to be smaller than the diameter $L_2$ of the ports 13 to 18 as in the case of the first embodiment so that there is an underlapping relation therebetween. The fluid circuit 61, the solenoids 62, 63 and 64, and the logical circuit 35 constitute means for electromagnetically controlling the movement the load 12 for stopping same at one of the shift positions.

Figure 7:
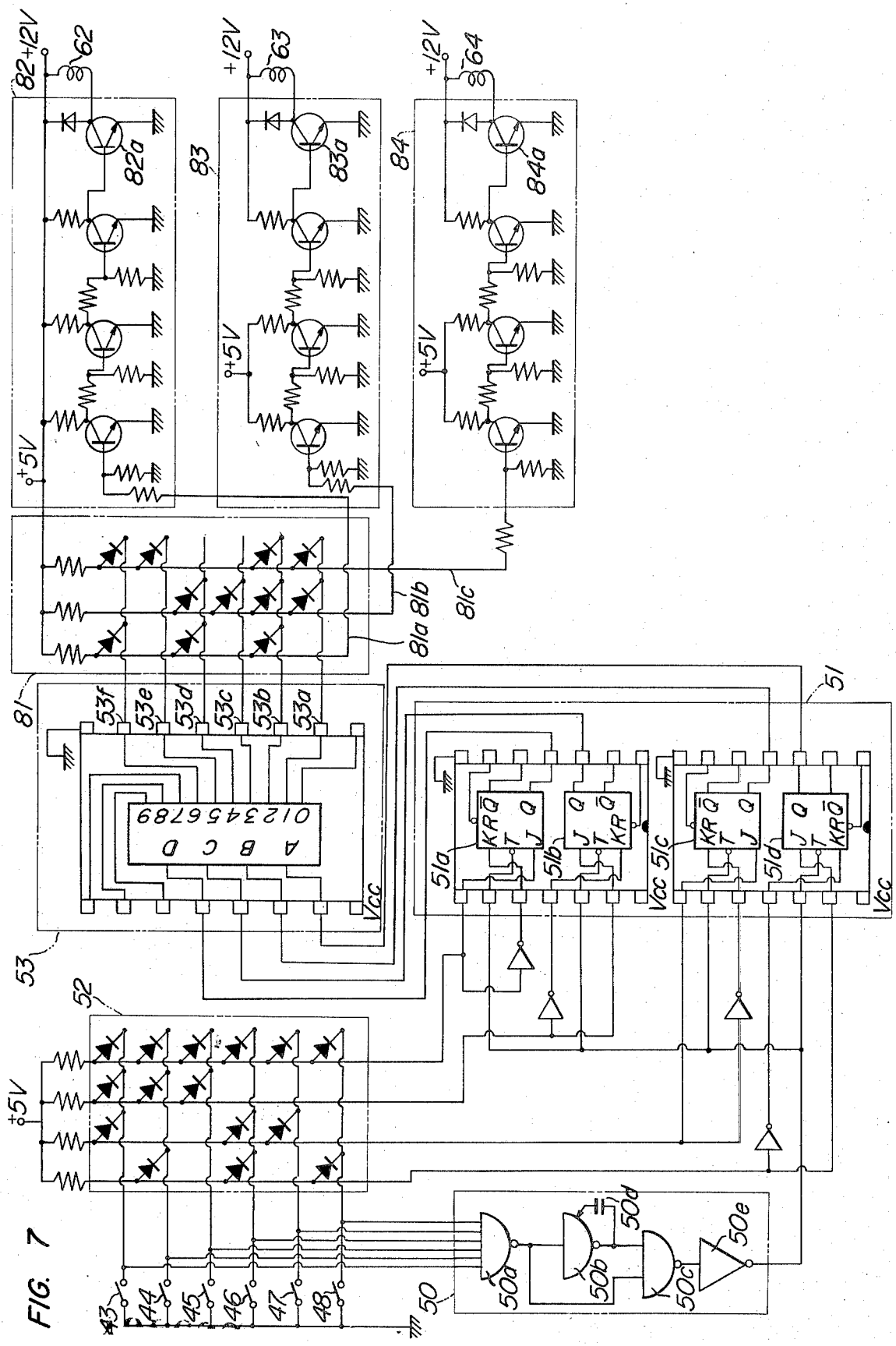
FIG. 7 is an electrical connection diagram showing in detail the structure of a logical circuit shown in FIG. 5.

Referring to FIG. 7 showing in detail the structure of the logical circuit 35, a plurality of switches 43, 44, 45, 46, 47 and 48 corresponding to the respective ports 13, 14, 15, 16, 17 and 18 are disposed on a keyboard so that one of the shift positions can be selected by manipulating the corresponding one of these switches. The logical circuit 35 includes a clock pulse generator 50, a memory 51, a diode matrix 52 and a decoder 53 all of which are similar to those shown in FIG. 3. It will be seen, however, that the number of inputs to the clock pulse generator 50 and diode matrix 52 in the second embodiment is six while it is seven in the first embodiment. Output leads $53a$, $53b$, $53c$, $53d$, $53e$ and $53f$ of the decoder 53 are connected to a diode matrix 81 so that three signals appear on output leads $81a$, $81b$ and $81c$ of the diode matrix 81 to be applied to respective amplifiers 82, 83 and 84 each including four transistors. The transistors $82a$, $83a$ and $84a$ in the last stage of these amplifiers 82, 83 and 84 are connected at their collector to the solenoids 62, 63 and 64 respectively.

The operation of the second embodiment of the present invention having the above structure will now be described. Suppose that the land 5 of the valve spool 4 is located at a position opposite to the port 14 as shown by the two-dot chain lines in FIG. 5. When now the switch 47 on the keyboard is closed in such a position of the land 5, the clock pulse generator 50, the diode matrix 52, the memory 51 and the decoder 53 operate in a manner similar to that described in the first embodiment. In that case, a signal of "1" level appears on the output leads $81a$ and $81b$ and a signal of "0" level appears on the output lead $81c$, respectively, of the diode matrix 81, and the signals are applied to the amplifiers 82, 83 and 84 respectively. Then, in the amplifiers 82, 83 and 84, the transistors $82a$ and $83a$ are cut off, while the transistor $84a$ conducts thereby energizing the associated solenoid 64. Due to the energization of the solenoid 64, the armature $64a$ is extended to urge the valve spool 67 against the force of the spring 70 and the valve spool 67 takes a position as shown in FIG. 5. On the other hand, the armatures $62a$ and $63a$ are in their retracted positions due to the fact that the solenoids 62 and 63 are not energized, and the valve spool 65 and 66 remain in the positions shown in FIG. 5 by being urged by the respective springs 68 and 69. In these positions of the valve spools 65, 66 and 67, the control chamber 7 communicates with the oil pan 34 through a groove portion $65a$ of the valve spool 65, the fluid passage 73, a groove portion $66a$ of the valve spool 66, the fluid passage 76, a groove portion $67a$ of the valve spool 67, and the return passages 79 and 80. As a result, the fluid pressure within the control chamber 7 is instantaneously reduced to a valve lower than the fluid pressure within the control chamber 6, and the land 5 of the valve spool 4 is urged toward the port 17 by the differential pressure across the control chambers 6 and 7. The land 5 of the valve spool 4 ceases to move when it is brought to a position opposite to the center of the port 17 as seen in FIGS. 5 and 6. Due to the fact that the axial length $L_1$ of the land 5 is smaller than the diameter $L_2$ of the port 17, gaps $G_1$ and $G_2$ are formed therebetween and because of the underlapping relation between the land 5 and the port 17 as seen in FIG. 6, the fluid under pressure within the control chambers 6 and 7 flows into the port 17 through the gaps $G_1$ and $G_2$ return to the oil pan 34 by way of the path above described. Thus, the land 5 of the valve spool 4 can be stably maintained at the position opposite to the center of the port 17. The load 12 which is connected to the valve spool 14 is shifted with the movement of the valve spool 4 until it is moved to one of the shift positions corresponding to the shifted position of the land 5.

Then, when the switch 43 on the keyboard is closed in order to shift the load 12 to another shift position from the above position, the transistor 82a in the amplifier 82 is cut off and the transistors 83a and 84a in the amplifiers 83 and 84 conduct, with the result that the solenoid 62 is de-energized and the solenoids 63 and 64 are energized. Thus, the armatures 63a and 64a are extended to urge the valve spools 66 and 67 against the force of the springs 69 and 70, and the port 13 communicates with the oil pan 34 through a groove portion 65b of the valve spool 65, the fluid passage 71, a groove portion 66b of the valve spool 66, the fluid passage 74, a groove portion 67b of the valve spool 67, and the return passages 77 and 80. As a result, the fluid pressure within the control chamber 6 is instantaneously reduced to a value lower than the fluid pressure within the control chamber 7, and the land 5 of the valve spool 4 is urged toward the port 13 by the differential pressure across the control chambers 6 and 7. The land 5 of the valve spool 4 ceases to move when it is brought to a position opposite to the center of the port 13. In this case too, because of the underlapping relation between the land 5 and the port 13, the land 5 of the valve spool 4 can be stably maintained at the position opposite to the center of the port 13.

It will be seen from the above description that, in response to the closure of anyone of the switches 43 to 48, logical signals representative of the specific switch appear on the output leads 81a, 81b and 81c of the diode matrix 81, and the transistors 82a, 83a and 84a in the amplifiers 82, 83 and 84 are selectively cut off and conduct controlling the energization and de-energization of the solenoids 62, 63 and 64, thereby bringing the land 5 of the valve spool 4 to a position opposite to the center of the port specified by the actuation of one of the switches 43 to 48, the land 5 being stably maintained in such a position due to the underlapping relation between it and the port. The following table shows the relation between the energization and de-energization of the solenoids 62, 63 and 64 and the ports 13, 14, 15, 16, 17 and 18 thereby opened in response to the manipulation of the switches 43, 44, 45, 46, 47 and 48:

TABLE

| Switch | Solenoid: 62 | 63 | 64 | Port opened |
|---|---|---|---|---|
| 43 | off | on | on | 13 |
| 44 | on | on | on | 14 |
| 45 | off | on | off | 15 |
| 46 | on | on | off | 16 |
| 47 | off | off | on | 17 |
| 48 | on | off | on | 18 |

It will be seen from the above table that, in response to the closure of anyone of the switches 43 to 48, the solenoids 62, 63 and 64 are selectively energized and de-energized according to a predetermined logical program, and the port corresponding to the actuated switch communicates with the oil pan 34 by the action of the fluid circuit 61 including the valve spools 65, 66 and 67 so that the land 5 of the valve spool 4 can be brought to the position opposite to the center of the specific port and stably maintained in such a position.

In the second embodiment of the present invention too, the land 5 can be stably maintained in the position opposite a specific port due to the balance between the fluid pressures within the control chambers 6 and 7 on opposite sides of the land 5 even when disconnection or any other trouble occurs in the power supply and the solenoid or solenoids having been energized are de-energized.

The present invention is in no way limited to the application referred to in the above and many changes and modifications may be made therein so that it suits various other services. For example, the present invention is similarly effectively applicable to the shift control of rods in machine tools.

It will be understood from the foregoing description that the present invention provides a system for electrically controlling the shift of a load and maintaining the load in one of a plurality of predetermined positions comprising a generally cylindrical body defining a cylindrical space therewithin, a plurality of spaced ports arranged in the axial direction of said cylindrical body at positions corresponding to the shift positions of the load, a valve spool having a land slidably received within said cylindrical body thereby partitioning the space within said cylindrical body into two control chambers, said land having an underlapping relation between it and each of said ports, means for supplying fluid under pressure into said control chambers, and means for electromagnetically controlling the communication of said ports with a fluid reservoir so that only one of said ports is selected and communicates with said fluid reservoir in response to the application of a corresponding one of a plurality of predetermined electrical signals, whereby, in response to the communication of said selected port with said fluid reservoir, said land of said valve spool is moved toward said selected port by being urged by the difference between the fluid pressures within said control chambers until it stops at a position opposite to the center of said selected port, and the fluid within said control chambers flows into said selected port through the gaps between said selected port and said land due to the underlapping relation therebetween. Thus, the land of the valve spool can be stably maintained stationary in the selected position thereby stably maintaining the load stationary in the shifted position. Further, even when the electromagnetically controlling means may be disabled due to disconnection or any other trouble occurring in the power supply, the land of the valve spool remains in the stationary position opposite to the selected port due to the fact that the fluid pressures within the control chambers on the opposite sides of the land are equal to each other. Moreover, because of the fact that the underlapping relation is maintained between the land of the valve spool in the stationary position and the port opposite to the land, the fluid is continuously discharged through the gaps between the land and the port to return to the fluid reservoir. In contrast, in the case in which the land is opposite to the port in an overlapping or zero-lapping relation thereby sealing the port against flow of fluid through the port, special consideration must be taken to prevent leakage of fluid and other undesirable conditions. Thus, the present invention is advantageous in that such consideration is unnecessary, any high-precision machining is unnecessary the degree of freedom of design can be enhanced and the relatively moving parts can be easily manufactured. Moreover, the movement of the valve spool can be remotely controlled due to the fact that the valve spool having the land to allow the communication of the selected port with the fluid reservoir is urged by the electrical signal produced by the electromagnetically controlling means.

Further, the present invention provides a control system of the above character, in which said means for electromagnetically controlling the communication of said ports with said fluid reservoir comprises a logical circuit generating the electrical signal by the combination of logical signals the number of which is less than the number of said ports, a plurality of solenoids selectively energized by the electrical signal delivered from said logical circuit, the number of said solenoids being less than the number of said ports and corresponding to the number of said logical signals, and fluid passage means controlled by the energized solenoid to allow said selected port to communicate with said fluid reservoir. Thus, the solenoid operated valves need not be provided for the individual ports, and the compact arrangement comprising the combination of the fluid passage means and the solenoids the number of which is less than the number of the ports can similarly effectively operate as when the solenoid operated valves are provided for the individual ports, thereby contributing to a reduction in the size and weight of the entire system.

We claim:

1. A system for electrically controlling the shift of a load and maintaining the load in one of a plurality of pre-determined positions, comprising:
   a body having a cylindrical space therein;
   a plurality of spaced ports in said body, said ports being arranged in the axial direction of the cylindrical space and in communication therewith, the ports being located at positions corresponding to the predetermined positions of the load;
   a valve spool operatively connected to said load and provided with a land slidably received within the cylindrical space thereby partitioning the space into two control chambers, said land having an underlapping relation between it and each of said ports;
   means for supplying fluid under pressure from a fluid reservoir to said control chambers;
   a plurality of selectively actuated switches, the number of said switches being equal to the number of said ports;
   a clock pulse generating circuit connected to said switch means for generating clock pulses when any of said switches is closed;
   a first diode matrix circuit connected to said switches for generating a binary code signal upon closure of a selected switch;
   a memory circuit connected to said clock pulse generating circuit and said first diode matrix circuit for storing said binary code signal;
   a decoder connected to said memory circuit for generating at output terminals of the decoder an output corresponding to the state of said switches;
   a plurality of solenoids, the number of solenoids being less than the number of ports;
   a plurality of energizing circuits each connected to a respective solenoid;
   a second diode matrix circuit responsive to the output of said decoder to operate said energizing circuits to selectively energize the solenoids;
   and means in said body, controlled by said solenoids, for directing passage of fluid through said control chambers and said ports to thereby position the land in underlapping relation to a port selected in accordance with the actuation of a particular one of said switches.

2. A system as set forth in claim 1, wherein the number of output terminals from said decoder is the same as the number of switches.

3. A system as set forth in claim 1, wherein said means for directing the passage of fluid comprises a plurality of additional cylindrical spaces within said body, each additional space containing a valve spool connected to a respective solenoid which is actuated upon selective energization of its associated solenoid; and fluid passages through said body interconnecting the cylindrical spaces therein.

4. A system as set forth in claim 3, wherein plural fluid passages interconnect adjacent cylindrical spaces.

5. A system as set forth in claim 3, wherein plural fluid passages interconnect adjacent cylindrical spaces, and said valve spools in the additional spaces have a plurality of lands for controlling the direction of the fluid through said plural passages.

* * * * *